(12) United States Patent
Hashimoto

(10) Patent No.: US 11,401,697 B2
(45) Date of Patent: Aug. 2, 2022

(54) CONTROL SYSTEM FOR WORK VEHICLE, METHOD, AND WORK VEHICLE

(71) Applicant: KOMATSU LTD., Tokyo (JP)

(72) Inventor: Kazuhiro Hashimoto, Tokyo (JP)

(73) Assignee: KOMATSU LTD., Tokyo (JP)

(*) Notice: Subject to any disclaimer, the term of this patent is extended or adjusted under 35 U.S.C. 154(b) by 392 days.

(21) Appl. No.: 16/607,773

(22) PCT Filed: Aug. 28, 2018

(86) PCT No.: PCT/JP2018/031751
§ 371 (c)(1),
(2) Date: Oct. 24, 2019

(87) PCT Pub. No.: WO2019/044821
PCT Pub. Date: Mar. 7, 2019

(65) Prior Publication Data
US 2020/0131740 A1 Apr. 30, 2020

(30) Foreign Application Priority Data

Aug. 29, 2017 (JP) .............................. JP2017-164216

(51) Int. Cl.
E02F 9/26 (2006.01)
G06Q 50/08 (2012.01)
(Continued)

(52) U.S. Cl.
CPC ............ E02F 9/262 (2013.01); G06Q 50/08 (2013.01); E02F 3/844 (2013.01); E02F 9/205 (2013.01);
(Continued)

(58) Field of Classification Search
CPC .......... E02F 9/262; E02F 9/205; E02F 3/844; G06Q 50/08; G05D 1/021; G05D 2201/0202
See application file for complete search history.

(56) References Cited

U.S. PATENT DOCUMENTS 4,820,041 A * 4/1989 Davidson ................ E02F 3/842
172/4.5
5,375,663 A * 12/1994 Teach ...................... E02F 3/847
172/4.5
(Continued)

FOREIGN PATENT DOCUMENTS

JP 6-15775 B2 3/1994
JP 2014-84683 A 5/2014
(Continued)

OTHER PUBLICATIONS

The International Search Report for the corresponding international application No. PCT/JP2018/031751, dated Nov. 6, 2018.

Primary Examiner — Russell Frejd
(74) Attorney, Agent, or Firm — Global IP Counselors, LLP

(57) ABSTRACT

A control system for a work vehicle includes a controller. The controller acquires actual topography data indicating an actual topography to be worked. The controller determines a target design topography indicating a target trajectory of a work implement based on the actual topography. The controller determines whether the actual topography is an upward gradient or a downward gradient based on the actual topography data. The controller changes the target design topography according to a result of determination of the gradient.

20 Claims, 15 Drawing Sheets

(51) Int. Cl.
*E02F 3/84* (2006.01)
*E02F 9/20* (2006.01)
*G05D 1/02* (2020.01)

(52) U.S. Cl.
CPC ..... *G05D 1/021* (2013.01); *G05D 2201/0202* (2013.01)

(56) References Cited

U.S. PATENT DOCUMENTS

| | | |
|---|---|---|
| 7,509,198 B2 | 3/2009 | Shull et al. |
| 2013/0087350 A1 | 4/2013 | Hayashi et al. |
| 2015/0019086 A1 | 1/2015 | Hayashi et al. |
| 2016/0076223 A1 | 3/2016 | Wei et al. |
| 2016/0273193 A1* | 9/2016 | Matsuyama ............ E02F 9/262 |
| 2018/0202129 A1 | 7/2018 | Fujii et al. |

FOREIGN PATENT DOCUMENTS

| | | |
|---|---|---|
| WO | 2008/118027 A2 | 10/2008 |
| WO | 2013/051378 A1 | 4/2013 |
| WO | 2017/119517 A1 | 7/2017 |

\* cited by examiner

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2018/031751, filed on Aug. 28, 2018. This U.S. National stage application claims priority under 35 U.S.C. § 119(a) to Japanese Patent Application No. 2017-164216, filed in Japan on Aug. 29, 2017, the entire contents of which are hereby incorporated herein by reference.

BACKGROUND

Field of the Invention

The present invention relates to a control system for a work vehicle, a method, and a work vehicle.

Background Information

The ground surface on which work is performed by a work vehicle does not always have a flat shape but usually has an undulation. U.S. Pat. No. 7,509,198 discloses a technique for determining a size of undulation on the ground surface and determining a digging start position according to the size of the undulation. Specifically, when the undulation is small, the controller determines a digging start position to be at a base of the undulation. When the undulation is large, the controller determines a digging start position to be at a position between a base and a peak of the undulation.

SUMMARY

However, a magnitude of the load on a work implement varies depending on whether a gradient is an upward gradient or a downward gradient. Because the above technique cannot handle different types of gradients, the load on the work implement may become excessive, or work efficiency may be reduced.

An object of the present invention is to provide a control system for a work vehicle, a method, and a work vehicle that enable to prevent a load on a work implement from becoming excessive while improving work efficiency.

A control system according to a first aspect is a control system for a work vehicle including a work implement. The control system includes a controller. The controller is programmed to execute the following processing. The controller acquires actual topography data indicating an actual topography to be worked. The controller determines a target design topography indicating a target trajectory of the work implement based on the actual topography. The controller determines whether the actual topography is an upward gradient or a downward gradient based on the actual topography data. The controller changes the target design topography according to a result of determination of the gradient.

A method according to a second aspect is a method executed by a controller for setting a target trajectory of a work implement of a work vehicle. The method includes the following processing. A first process is to acquire actual topography data indicating an actual topography to be worked. A second process is to determine a target design topography indicating a target trajectory of a work implement based on the actual topography. A third process is to determine whether the actual topography is an upward gradient or a downward gradient based on the actual topography data. A fourth process is to change the target design topography according to a result of determination of the gradient.

A work vehicle according to a third aspect is a work vehicle including a work implement and a controller that controls the work implement. The controller is programmed to execute the following processing. The controller acquires actual topography data indicating an actual topography to be worked. The controller determines a target design topography indicating a target trajectory of the work implement based on the actual topography. The controller determines whether the actual topography is an upward gradient or a downward gradient based on the actual topography data. The controller changes the target design topography according to a result of determination of the gradient. The controller outputs a command signal for controlling the work implement according to the target design topography.

In the present invention, a target design topography is determined based on an actual topography, and the target design topography is changed according to a result of determination as to whether the actual topography is an upward gradient or a downward gradient. As a result, a load on the work implement can be prevented from becoming excessive while work efficiency can be improved.

DETAILED DESCRIPTION OF EMBODIMEN(T)

Figure 1:
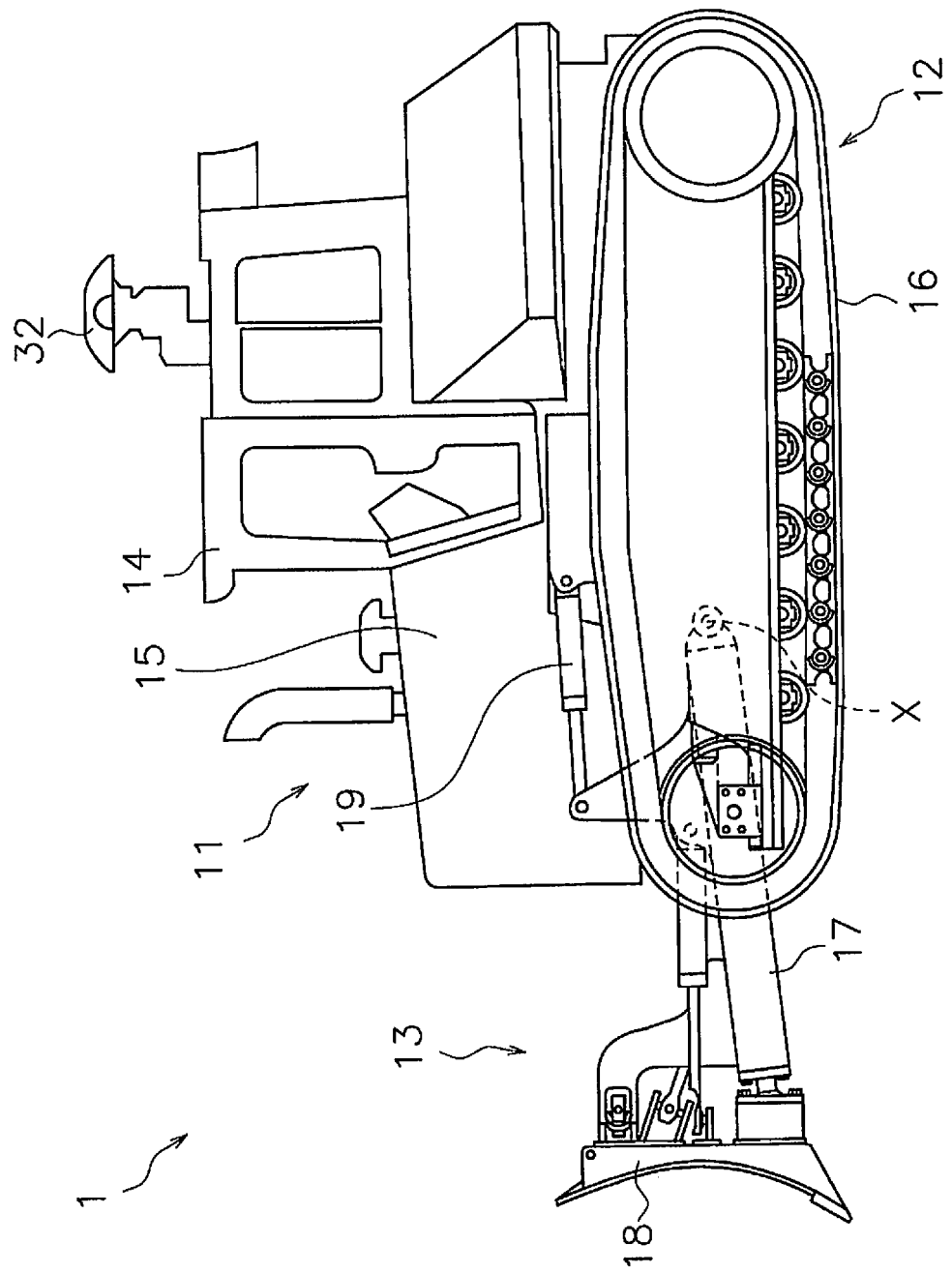
FIG. 1 is a side view of a work vehicle according to an embodiment.

A work vehicle according to an embodiment will now be described with reference to the drawings. FIG. 1 is a side view of a work vehicle 1 according to an embodiment. The work vehicle 1 according to the present embodiment is a bulldozer. The work vehicle 1 includes a vehicle body 11, a travel device 12, and a work implement 13.

The vehicle body 11 includes an operating cabin 14 and an engine compartment 15. An operator's seat that is not illustrated is disposed in the operating cabin 14. The engine compartment 15 is disposed in front of the operating cabin 14. The travel device 12 is attached to a bottom portion of the vehicle body 11. The travel device 12 includes a pair of right and left crawler belts 16. Only the left crawler belt 16 is illustrated in FIG. 1. The work vehicle 1 travels due to the rotation of the crawler belts 16. The travel of the work vehicle 1 may be either autonomous travel, semi-autonomous travel, or travel under operation by an operator.

The work implement 13 is attached to the vehicle body 11. The work implement 13 includes a lift frame 17, a blade 18, and a lift cylinder 19.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down.

The lift cylinder 19 is coupled to the vehicle body 11 and the lift frame 17. Due to the extension and contraction of the lift cylinder 19, the lift frame 17 rotates up and down around the axis X.

Figure 2:
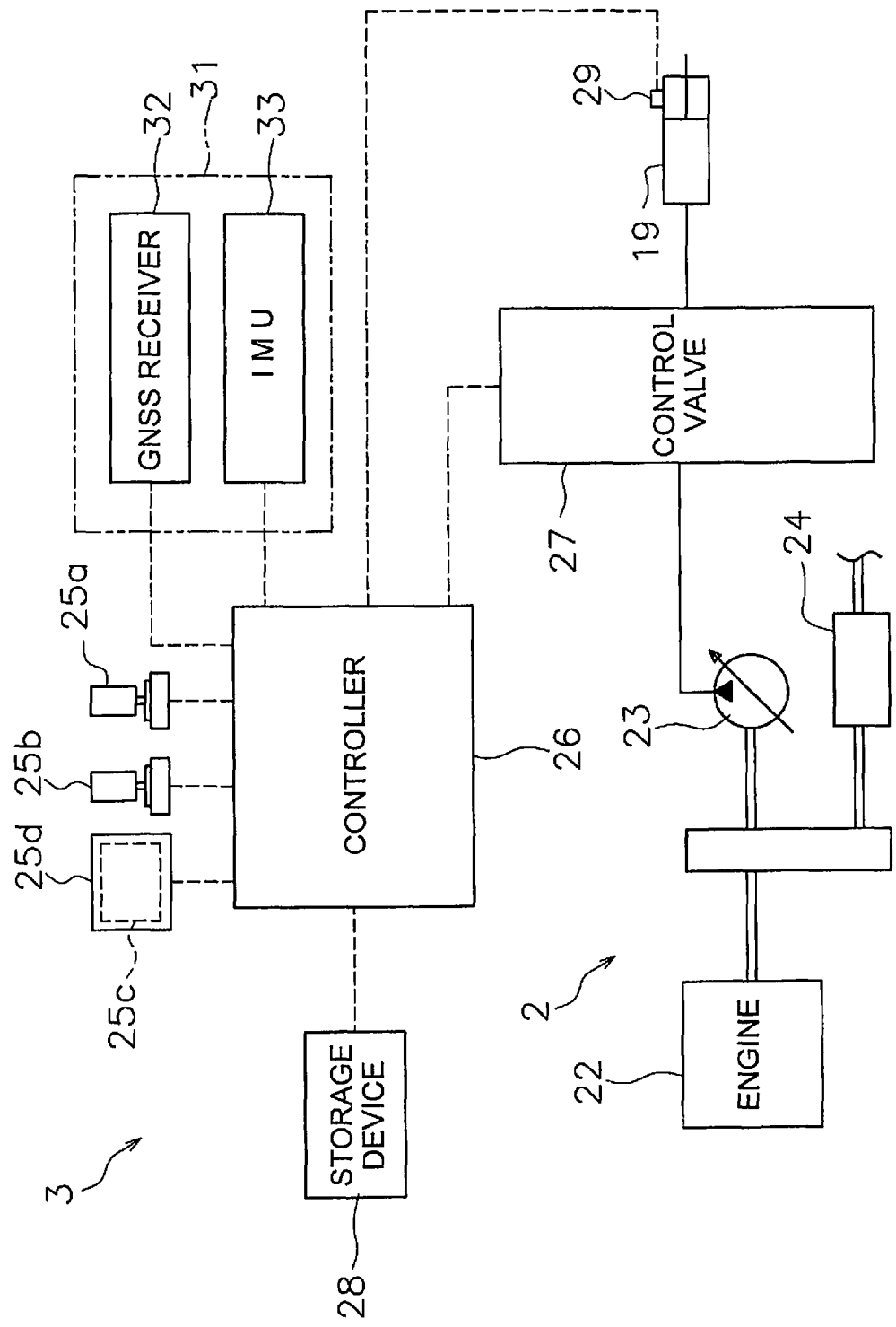
FIG. 2 is a block diagram of a drive system and a control system of the work vehicle.

FIG. 2 is a block diagram of a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. Although only one hydraulic pump 23 is illustrated in FIG. 2, a plurality of hydraulic pumps may be provided.

The power transmission device 24 transmits driving force of the engine 22 to the travel device 12. The power transmission device 24 may be a hydro static transmission (HST), for example. Alternatively, the power transmission device 24 may be, for example, a torque converter or a transmission having a plurality of transmission gears.

The control system 3 includes a first operating device 25a and a second operating device 25b. The first operating device 25a and the second operating device 25b are disposed in the operating cabin 14. The first operating device 25a is a device for operating the travel device 12. The first operating device 25a receives an operation by the operator for driving the travel device 12, and outputs an operation signal in response to the operation.

The second operating device 25b is a device for operating the work implement 13. The second operating device 25b receives an operation by the operator for driving the work implement 13, and outputs an operation signal in response to the operation. The first operating device 25a and the second operating device 25b include, for example, an operating lever, a pedal, a switch, or the like.

The first operating device 25a is configured to be operable at a forward position, a reverse position, and a neutral position. An operation signal indicating a position of the first operating device 25a is output to the controller 26. When the operating position of the first operating device 25a is in the forward position, the controller 26 controls the travel device 12 or the power transmission device 24 so that the work vehicle 1 moves forward. When the operating position of the first operating device 25a is in the reverse position, the controller 26 controls the travel device 12 or the power transmission device 24 so that the work vehicle 1 moves in reverse.

The second operating device 25b is configured to be operable at a raising position, a lowering position, and a neutral position. An operation signal indicating a position of the second operating device 25b is output to the controller 26. When the operating position of the second operating device 25b is in the raising position, the controller 26 controls the lift cylinder 19 so that the blade 18 is raised. When the operating position of the second operating device 25b is in the lowering position, the controller 26 controls the lift cylinder 19 so that the blade 18 is lowered.

The control system 3 includes an input device 25c and a display 25d. The input device 25c and the display 25d are, for example, touch screen-type display input devices. The display 25d is, for example, an LCD or an OLED. The display 25d may be another type of display device. The input device 25c and the display 25d may be separate devices. For example, the input device 25c may be another input device such as a switch. The input device 25c may be a pointing device such as a mouse or a trackball. The input device 25c outputs an operation signal indicating an operation by the operator to the controller 26.

The control system 3 includes a controller 26, a storage device 28, and a control valve 27. The controller 26 is programmed to control the work vehicle 1 based on acquired data. The controller 26 includes, for example, a processor such as a CPU. The controller 26 acquires an operation signal from the operating devices 25a and 25b. The controller 26 controls the control valve 27 based on the operation signal. The controller 26 acquires an operation signal from the input device 25c. The controller 26 outputs a signal to display a predetermined screen on the display 25d. The controller 26 is not limited to one unit and may be divided into a plurality of controllers.

The control valve 27 is a proportional control valve and is controlled by a command signal from the controller 26. The control valve 27 is disposed between a hydraulic actuator such as the lift cylinder 19 and the hydraulic pump 23. The control valve 27 controls the flow rate of the hydraulic fluid supplied from the hydraulic pump 23 to the lift cylinder 19. The controller 26 generates a command signal to the control valve 27 so that the blade 18 operates in response to an operation of the second operating device 25b. As a result, the lift cylinder 19 is controlled in response to an operation amount of the second operating device 25b. The control valve 27 may be a pressure proportional control valve. Alternatively, the control valve 27 may be an electromagnetic proportional control valve.

Figure 3:
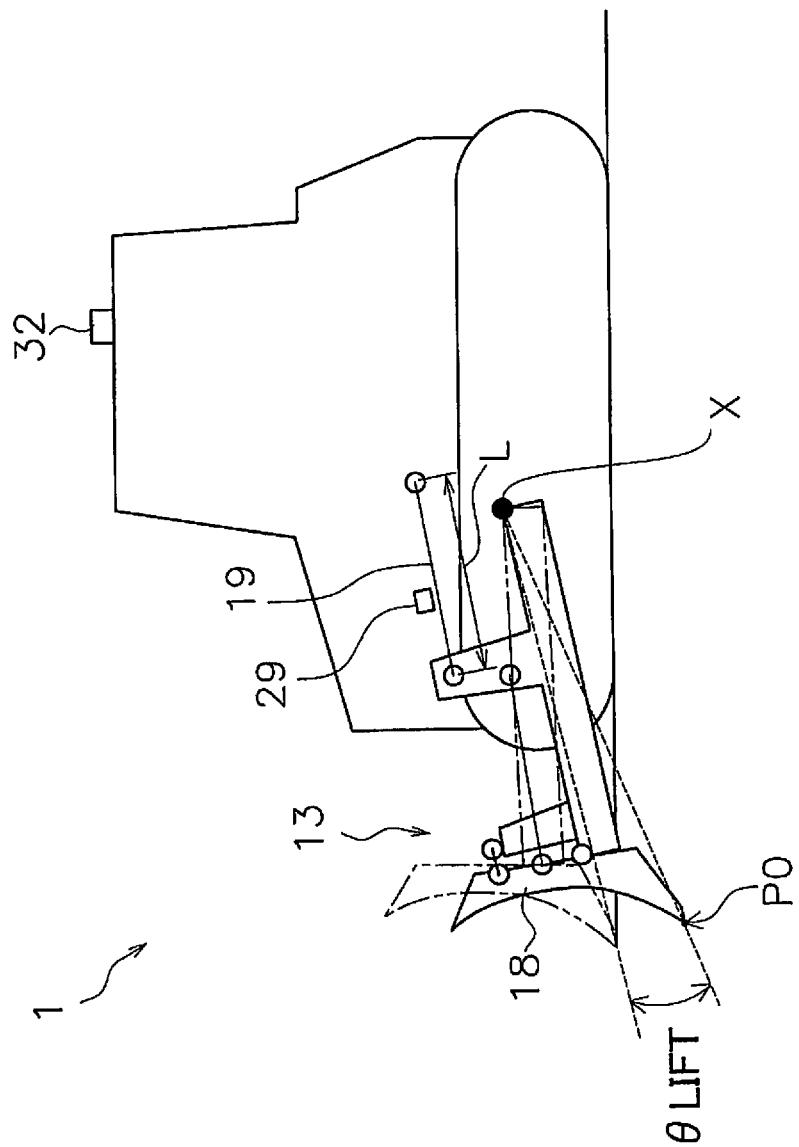
FIG. 3 is a schematic view of a configuration of the work vehicle.

The control system 3 includes a work implement sensor 29. The work implement sensor 29 senses a position of the work implement and outputs a work implement position signal indicating the position of the work implement. Specifically, the work implement sensor 29 senses the stroke length of the lift cylinder 19 (hereinafter referred to as "lift cylinder length L"). As illustrated in FIG. 3, the controller 26 calculates a lift angle $\theta$lift of the blade 18 based on the lift cylinder length L. FIG. 3 is a schematic view of a configuration of the work vehicle 1.

In FIG. 3, the origin position of the work implement 13 is illustrated as a chain double-dashed line. The origin position of the work implement 13 is the position of the blade 18 in a state where the tip of the blade 18 is in contact with the ground surface on a horizontal ground surface. The lift angle $\theta$lift is the angle from the origin position of the work implement 13.

As illustrated in FIG. 2, the control system 3 includes a position sensor 31. The position sensor 31 measures a position of the work vehicle 1. The position sensor 31 includes a global navigation satellite system (GNSS) receiver 32 and an IMU 33. The GNSS receiver 32 is, for example, a receiver for global positioning system (GPS). An antenna of the GNSS receiver 32 is disposed on the operating cabin 14. The GNSS receiver 32 receives a positioning signal from a satellite and calculates the position of the antenna based on the positioning signal to generate vehicle body position data. The controller 26 acquires the vehicle body position data from the GNSS receiver 32. The controller 26 acquires the traveling direction and vehicle speed of the work vehicle 1 from the vehicle body position data.

The IMU 33 is an inertial measurement unit. The IMU 33 acquires vehicle body inclination angle data. The vehicle body inclination angle data includes an angle (pitch angle) with respect to the horizontal in the vehicle longitudinal direction and an angle (roll angle) with respect to the horizontal in the vehicle lateral direction. The controller 26 acquires the vehicle body inclination angle data from the IMU 33.

The controller 26 calculates a blade tip position P0 from the lift cylinder length L, the vehicle body position data, and the vehicle body inclination angle data. As illustrated in FIG. 3, the controller 26 calculates global coordinates of the GNSS receiver 32 based on the vehicle body position data. The controller 26 calculates the lift angle θlift based on the lift cylinder length L. The controller 26 calculates the local coordinates of the blade tip position P0 with respect to the GNSS receiver 32 based on the lift angle θlift and the vehicle body dimension data. The vehicle body dimension data is stored in the storage device 28 and indicates the position of the work implement 13 with respect to the GNSS receiver 32. The controller 26 calculates the global coordinates of the blade tip position P0 based on the global coordinates of the GNSS receiver 32, the local coordinates of the blade tip position P0, and the vehicle body inclination angle data. The controller 26 acquires the global coordinates of the blade tip position P0 as blade tip position data.

The storage device 28 includes, for example, a memory and an auxiliary storage device. The storage device 28 may be, for example, a RAM or a ROM. The storage device 28 may be a semiconductor memory, a hard disk, or the like. The storage device 28 is an example of a non-transitory computer-readable recording medium. The storage device 28 stores computer commands that are executable by the processor and for controlling the work vehicle 1.

The storage device 28 stores design topography data and work site topography data. The design topography data indicates a final design topography. The final design topography is the final target shape of the surface of the work site. The design topography data is, for example, a construction drawing in a three-dimensional data format. The work site topography data indicates an actual topography of the work site. The work site topography data is, for example, an actual topography survey map in a three-dimensional data format. The work site topography data can be acquired by aerial laser survey, for example.

The controller 26 acquires actual topography data. The actual topography data indicates an actual topography of the work site. The actual topography of the work site is an actual topography of a region along the traveling direction of the work vehicle 1. The actual topography data is acquired by calculation in the controller 26 from the work site topography data, and the position and traveling direction of the work vehicle 1 acquired from the aforementioned position sensor 31.

The controller 26 automatically controls the work implement 13 based on the actual topography data, the design topography data, and the blade tip position data. The automatic control of the work implement 13 may be semi-automatic control performed in combination with manual operation by the operator. Alternatively, the automatic control of the work implement 13 may be a fully automatic control performed without manual operation by the operator.

Figure 4:
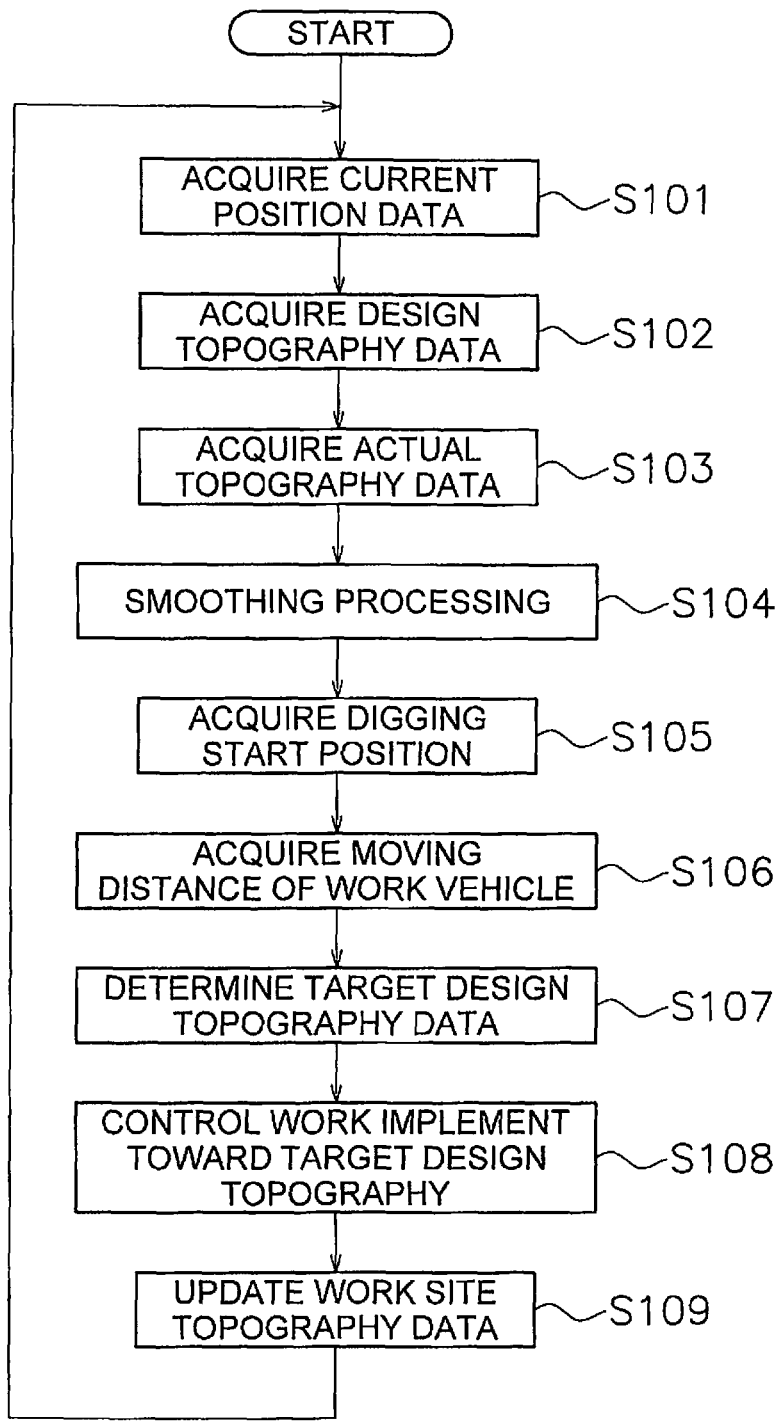
FIG. 4 is a flowchart illustrating automatic control processing of a work implement.

The automatic control of the work implement 13 in digging executed by the controller 26 will be described below. FIG. 4 is a flowchart illustrating automatic control processing of the work implement 13 in digging work.

As illustrated in FIG. 4, in step S101, the controller 26 acquires current position data. At this time, the controller 26 acquires the current blade tip position P0 of the blade 18 as described above.

Figure 5:
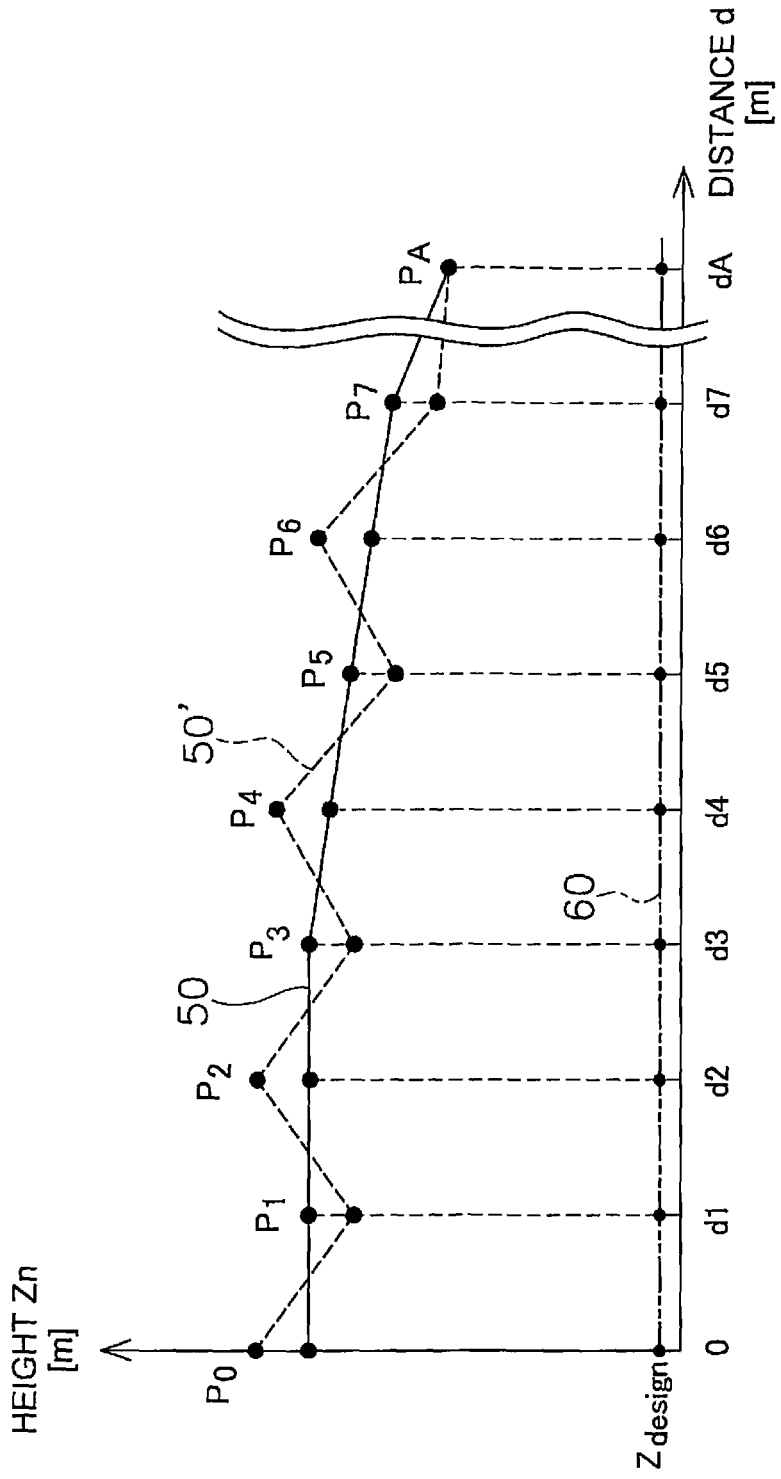
FIG. 5 is a graph illustrating an example of an actual topography before and after smoothing processing.

In step S102, the controller 26 acquires design topography data. As illustrated in FIG. 5, the design topography data includes a height Zdesign of a final design topography 60 at a plurality of reference points Pn (n=0, 1, 2, 3, . . . , A) in the traveling direction of the work vehicle 1. The plurality of reference points Pn indicate a plurality of points at a predetermined interval along the traveling direction of the work vehicle 1. The plurality of reference points Pn are on the travel path of the blade 18. In FIG. 5, the final design topography 60 has a flat shape parallel to the horizontal direction, but may have a different shape.

In step S103, the controller 26 acquires actual topography data. The controller 26 acquires the actual topography data by calculation from the work site topography data acquired from the storage device 28, and the vehicle body position data and traveling direction data acquired from the position sensor 31. The actual topography data is information indicating a topography positioned in the traveling direction of the work vehicle 1.

In step S104, the controller 26 performs smoothing processing on the actual topography data. FIG. 5 illustrates a cross section of an actual topography 50. In FIG. 5, the vertical axis indicates the height of the topography, and the horizontal axis indicates the distance from the current position in the traveling direction of the work vehicle 1.

Specifically, the actual topography data includes the height Zn of the actual topography 50 at the plurality of reference points Pn from the current position to a predetermined topography recognition distance dA in the traveling direction of the work vehicle 1. In the present embodiment, the current position is the position determined based on the current blade tip position P0 of the work vehicle 1. The current position may be determined based on a current position of another portion of the work vehicle 1. The plurality of reference points are arranged at a predetermined interval, for example, every one meter.

In FIG. 5, an actual topography 50' illustrated by a dashed line indicates the actual topography data before the smoothing processing. The actual topography 50 illustrated by a solid line indicates the actual topography data after the smoothing processing. The term "smoothing" means processing to smooth variations in the height of the actual topography 50. For example, the controller 26 smooths the height Zn at a plurality of points of the actual topography 50 by the following formula (1).

$$Z_{n\_sm} = (\Sigma_{k=n-2}^{n+2} Z_k)/5 \qquad (1)$$

Zn_sm indicates the height of each point on the smoothed actual topography 50. In the following description, the simple term "actual topography 50" means the actual topography 50 on which the smoothing processing is performed in step S104.

In step S105, the controller 26 acquires a digging start position. For example, the controller 26 acquires, as the digging start position, the position at which the blade tip position P0 drops below the height Z0 of the actual topography 50 for the first time. As a result, the position at which the tip of the blade 18 is lowered and digging of the actual topography 50 is started is acquired as the digging start position. However, the controller 26 may acquire the digging start position by another method. For example, the controller 26 may acquire the digging start position based on the operation of the second operating device 25b. Alternatively, the controller 26 may acquire the digging start position by calculating the optimal digging start position from the actual topography data.

In step S106, the controller 26 acquires a moving distance of the work vehicle 1. The controller 26 acquires, as the moving distance, the distance traveled from the digging start position to the current position in the travel path of the blade 18. The moving distance of the work vehicle 1 may be a moving distance of the vehicle body 11. Alternatively, the moving distance of the work vehicle 1 may be a moving distance of the tip of the blade 18.

In step S107, the controller 26 determines target design topography data. The target design topography data indicates a target design topography 70 illustrated by a dashed line in FIG. 6. The target design topography 70 indicates a desired trajectory of the tip of the blade 18 in work. In other words, the target design topography 70 indicates a desired shape as a result of the digging work.

Figure 6:
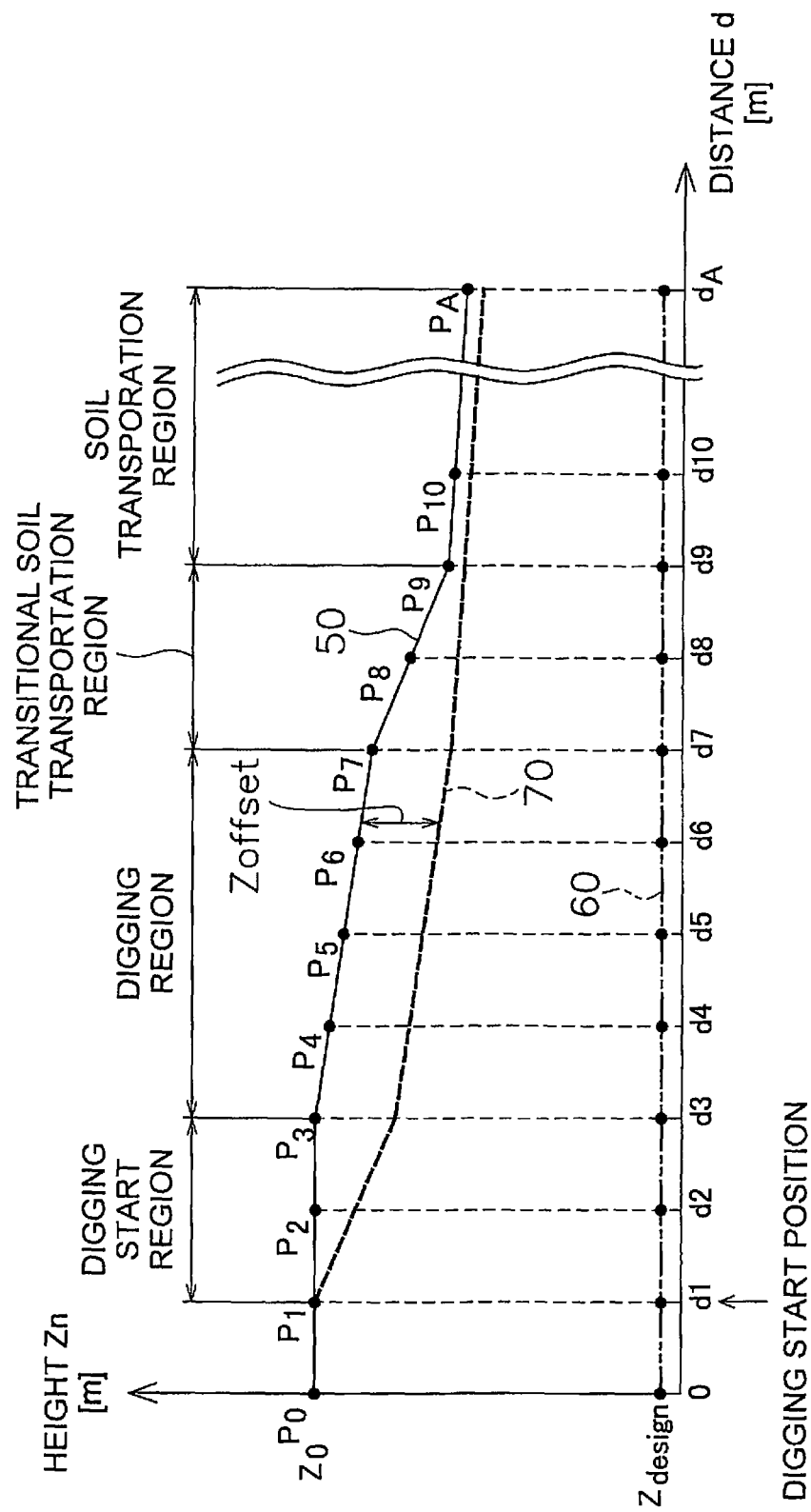
FIG. 6 is a graph illustrating an example of an actual topography, a final design topography and a target design topography.

As illustrated in FIG. 6, the controller 26 determines the target design topography 70 displaced by a target displacement Z_offset downward from the actual topography 50. The target displacement Z_offset is the target displacement in the vertical direction at each reference point Pn. In the present embodiment, the target displacement Z_offset is a target depth at each reference point Pn, and indicates a target position of the blade 18 below the actual topography 50. The target position of the blade 18 means the position of the tip of the blade 18. In other words, the target displacement Z_offset indicates a soil amount per unit moving distance to be dug by the blade 18. Therefore, the target design topography data indicates the relation between the plurality of reference points Pn and a plurality of target soil amounts. The target displacement Z_offset is an example of a target parameter related to a target digging amount of the blade 18.

The controller 26 determines the target design topography 70 so that the target design topography 70 does not go below the final design topography 60. Therefore, the controller 26 determines the target design topography 70 positioned at or above the final design topography 60 and below the actual topography 50 during the digging work.

Specifically, the controller 26 determines the height Z of the target design topography 70 by the following formula (2).

$$Z = Zn - t1 \times Z\_\text{offset} \quad (2)$$

The target displacement Z_offset is determined by referring to a target parameter data C. The target parameter data C is stored in the storage device 28. t1 is a correction coefficient according to an inclination degree parameter as described later. Therefore, when the correction by the correction coefficient t1 is performed, a value acquired by multiplying Z_offset by t1 is the corrected target displacement.

Figure 7:
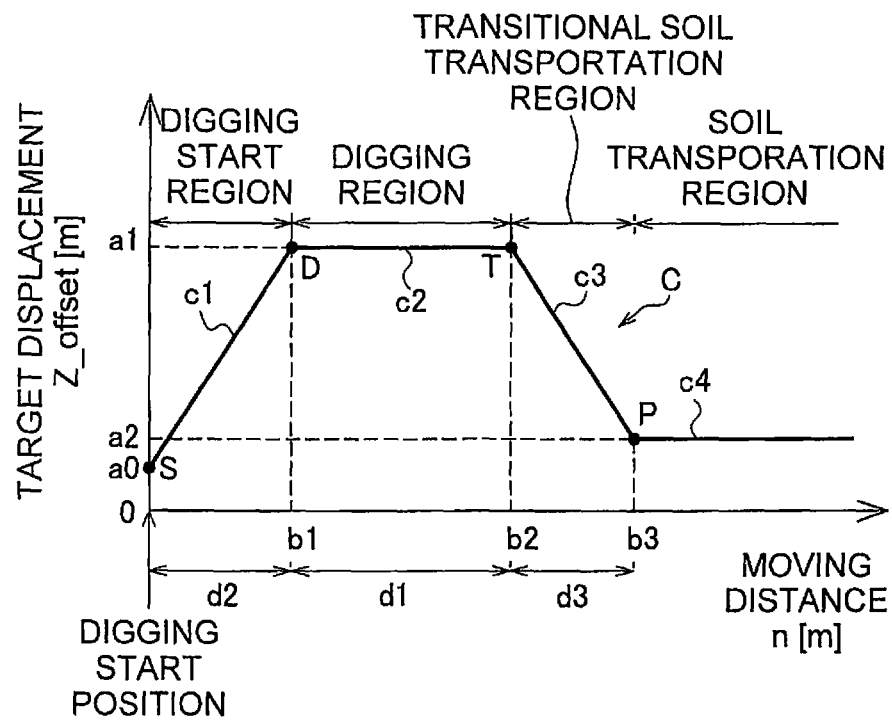
FIG. 7 is a graph illustrating an example of target parameter data.

FIG. 7 is a graph illustrating an example of the target parameter data C. The target parameter data C defines the relation between a moving distance n of the work vehicle 1 and the target parameter. In the present embodiment, the target parameter data C defines the relation between the moving distance n of the work vehicle 1 and the target displacement Z_offset.

Specifically, the target parameter data C indicates a digging depth (target displacement) Z_offset of the blade 18 in the vertically downward direction from the ground surface as a dependent variable of the moving distance n of the work vehicle 1 in the horizontal direction. The moving distance n of the work vehicle 1 in the horizontal direction is substantially the same as the moving distance of the blade 18 in the horizontal direction. The controller 26 determines the target displacement Z_offset from the moving distance n of the work vehicle 1 by referring to the target parameter data C illustrated in FIG. 7.

As illustrated in FIG. 7, the target parameter data C includes data at start c1, data during digging c2, data during transition c3, and data during soil transportation c4. The data at start c1 defines the relation between the moving distance n and the target displacement Z_offset in a digging start region. The digging start region is the region from a digging start point S to a steady digging start point D. As indicated by the data at start c1, the target displacement Z_offset that increases as the moving distance n increases is defined in the digging start region.

The data during digging c2 defines the relation between the moving distance n and the target displacement Z_offset in a digging region. The digging region is the region from the steady digging start point D to a transitional soil transportation start point T. As indicated by the data during digging c2, the target displacement Z_offset is defined to a constant value in the digging region. The data during digging c2 defines a constant target displacement Z_offset with respect to the moving distance n.

The data during transition c3 defines the relation between the moving distance n and the target displacement Z_offset in a transitional soil transportation region. The transitional soil transportation region is the region from a steady digging end point T to a soil transportation start point P. The data during transition c3 defines the target displacement Z_offset that decreases as the moving distance n increases.

The data during soil transportation c4 defines the relation between the moving distance n and the target displacement Z_offset in a soil transportation region. The soil transportation region is the region starting from the soil transportation start point P. As indicated by the data during soil transportation c4, the target displacement Z_offset is defined to a constant value in the soil transportation region. The data during soil transportation c4 defines a constant target displacement Z_offset with respect to the moving distance n.

Specifically, the digging region starts at a first start value b1 and ends at a first end value b2. The soil transportation region starts at a second start value b3. The first end value b2 is smaller than the second start value b3. Therefore, the digging region starts when the moving distance n in the digging region is less than the moving distance n in the soil transportation region. The target displacement Z_offset in the digging region is constant at a first target value a1. The target displacement Z_offset in the soil transportation region is constant at a second target value a2. The first target value a1 is larger than the second target value a2. Therefore, the target displacement Z_offset defined in the digging region is larger than the target displacement Z_offset in the soil transportation region.

The target displacement Z_offset at the digging start position is a start value a0. The start value a0 is smaller than the first target value a1. The start target value a0 is smaller than the second target value a2.

Figure 8:
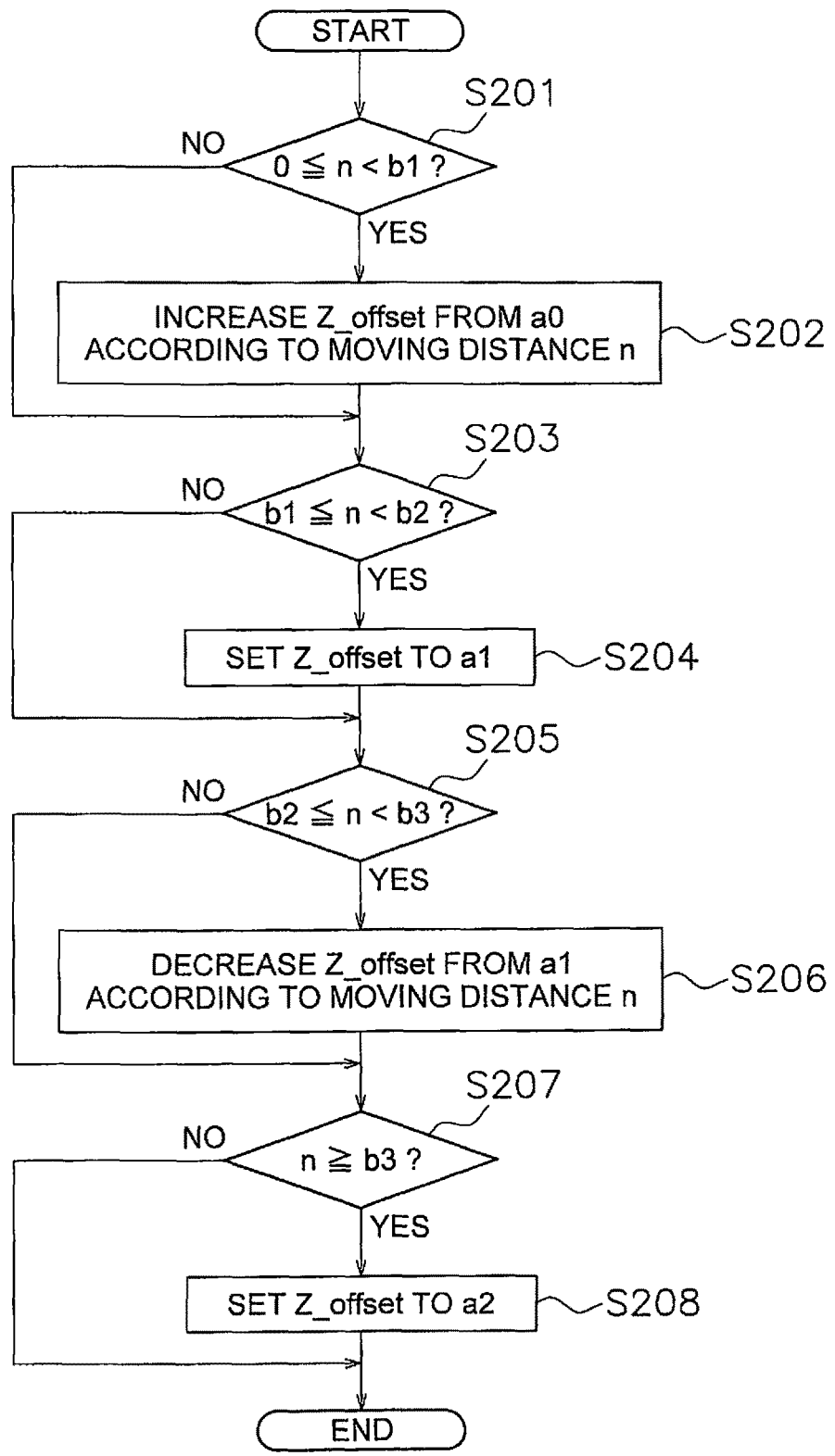
FIG. 8 is a flowchart illustrating processing for determining a target displacement.

FIG. 8 is a flowchart illustrating processing for determining the target displacement Z_offset. In order to simplify the following description, it is assumed that the work vehicle 1 travels only forward in the determination processing as described below. The determination processing starts when the first operating device 25a moves to the forward position. In step S201, the controller 26 determines whether the moving distance n is equal to or greater than zero and less than the first start value b1. When the moving distance n is equal to or greater than zero and less than the first start value b1, the controller 26 gradually increases the target displacement Z_offset from the start value a0 as the moving distance n increases in step S202.

The start value a0 is a constant and is stored in the storage device 28. The start value a0 is preferably a small value at which the load on the blade 18 at the digging start will not be excessively large. The first start value b1 is acquired by calculation from an inclination c1 in the digging start region, the start value a0, and the first target value a1 illustrated in FIG. 7. The inclination c1 is a constant and is stored in the storage device 28. The inclination c1 is preferably a value at which a quick transition from the digging start to the digging work can be performed and the load on the blade 18 will not be excessively large.

In step S203, the controller 26 determines whether the moving distance n is equal to or greater than the first start value b1 and less than the first end value b2. When the moving distance n is equal to or greater than the first start value b1 and less than the first end value b2, the controller 26 sets the target displacement Z_offset to the first target value a1 in step S204. The first target value a1 is a constant and is stored in the storage device 28. The first target value a1 is preferably a value at which the digging can be performed efficiently and the load on the blade 18 will not be excessively large.

In step S205, the controller 26 determines whether the moving distance n is equal to or greater than the first end value b2 and less than the second start value b3. When the moving distance n is equal to or greater than the first end value b2 and less than the second start value b3, the controller 26 gradually decreases the target displacement Z_offset from the first target value a1 as the moving distance n increases in step S206.

The first end value b2 is a moving distance at a time when the current amount of soil held by the blade 18 exceeds a predetermined threshold. Therefore, when the current amount of soil held by the blade 18 exceeds the predetermined threshold, the controller 26 decreases the target displacement Z_offset from the first target value a1. The predetermined threshold is determined based, for example, on the maximum capacity of the blade 18. For example, the current amount of soil held by the blade 18 may be determined by measuring a load on the blade 18 and by calculating from the load. Alternatively, the current amount of soil held by the blade 18 may be calculated by acquiring an image of the blade 18 with a camera and by analyzing the image.

At the start of work, a predetermined initial value is set as the first end value b2. After the start of work, the moving distance when the amount of soil held by the blade 18 exceeds the predetermined threshold is stored as an updated value, and the first end value b2 is updated based on the stored updated value.

In step S207, the controller 26 determines whether the moving distance n is equal to or greater than the second start value b3. When the moving distance n is equal to or greater than the second start value b3, the controller 26 sets the target displacement Z_offset to the second target value a2 in step S208.

The second target value a2 is a constant and is stored in the storage device 28. The second target value a2 is preferably set to a value suitable for the soil transportation work. The second start value b3 is found by calculation from the inclination c3 in the transitional soil transportation region, the first target value a1, and the second target value a2 illustrated in FIG. 7. The inclination c3 is a constant and is stored in the storage device 28. The inclination c3 is preferably a value at which a quick transition from the digging work to the soil transportation work can be performed and the load on the blade 18 will not be excessively large.

The start value a0, the first target value a1, and the second target value a2 may be changed according to a condition of the work vehicle 1 or the like. The first start value b1, the first end value b2, and the second start value b3 may be stored in the storage device 28 as constants.

Figure 9:
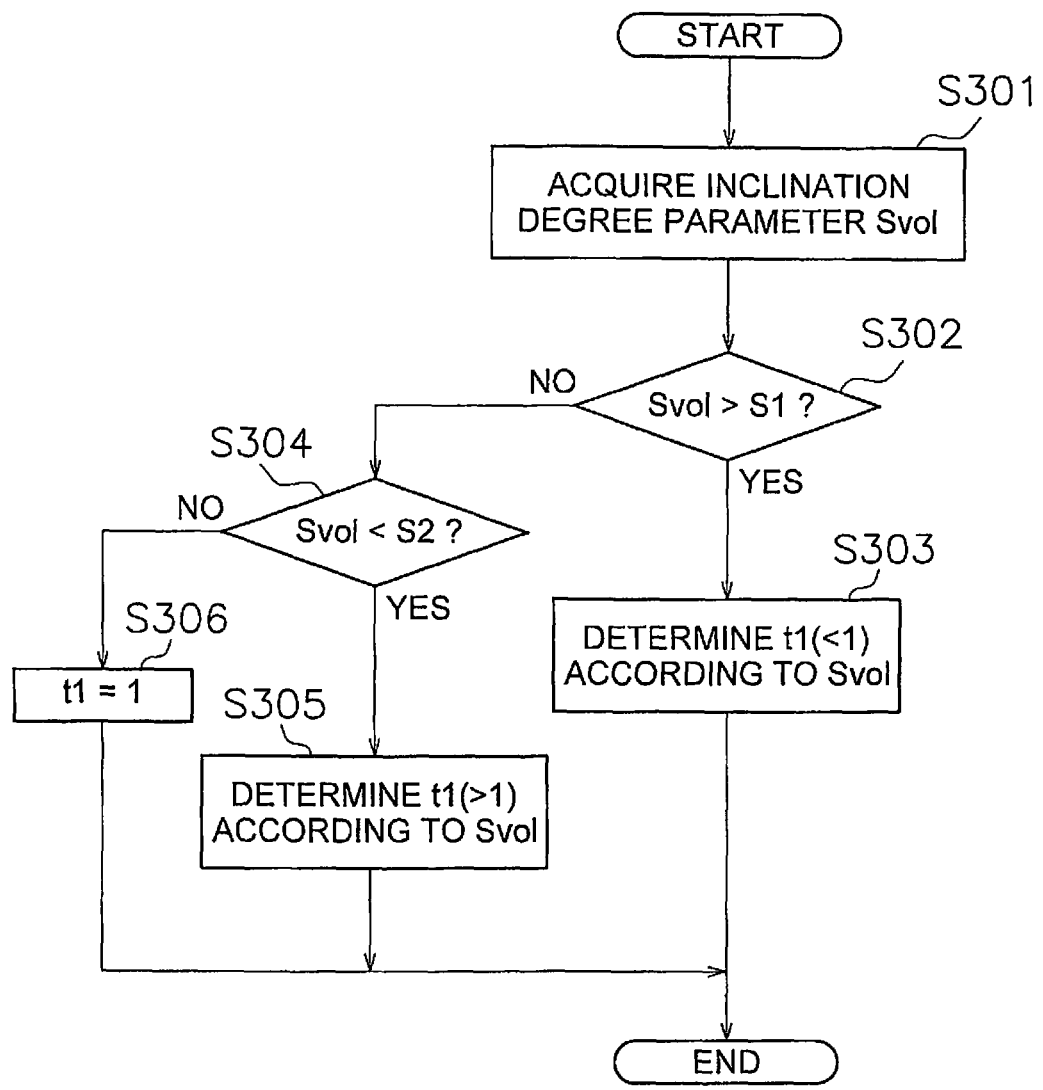
FIG. 9 is a flowchart illustrating processing for determining a correction coefficient.

Next, processing for determining a correction coefficient t1 according to an inclination degree parameter will be described. FIG. 9 is a flowchart illustrating the processing for determining the correction coefficient t1. As illustrated in FIG. 9, the controller 26 acquires an inclination degree parameter Svol in step S301. The inclination degree parameter Svol is the parameter indicating a degree of the inclination of the actual topography 50. A larger absolute value of the inclination degree parameter Svol indicates a greater degree of the inclination of the actual topography 50.

Figure 10:
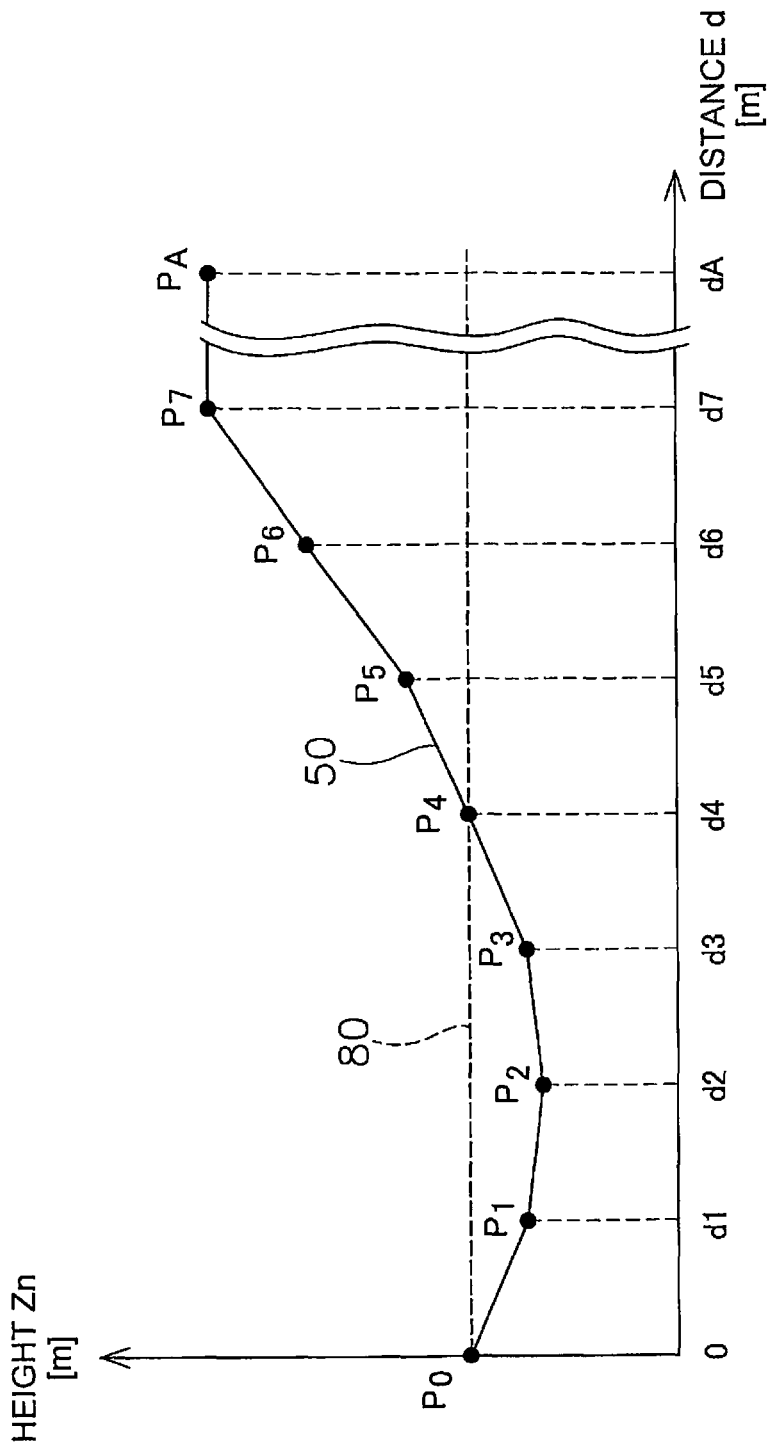
FIG. 10 is a graph illustrating an example of an inclination degree parameter.

The controller 26 calculates a difference between a predetermined horizontal surface 80 and the actual topography 50 to determine the difference as the inclination degree parameter Svol. As illustrated in FIG. 10, the predetermined horizontal surface 80 is the horizontal surface passing through the height of the actual topography 50 at the digging start position. Alternatively, the horizontal surface 80 may be a horizontal surface passing through another position. For example, the horizontal surface 80 may be a horizontal surface passing through the height of the actual topography 50 at the current position of the work vehicle 1.

The controller 26 determines, as the inclination degree parameter Svol, the difference between the horizontal surface 80 and the height Zn at each reference point Pn of the actual topography 50. Specifically, the controller 26 calculates the inclination degree parameter Svol by the following formula (3).

$$Svol = \left(\sum_{n=0}^{A} Zn\right) / A - Zo \qquad (3)$$

That is, the inclination degree parameter Svol is the difference between the height Z0 of the horizontal surface 80 and an average of the heights Zn of the actual topography 50 at the plurality of reference points Pn (n=0, 1, . . . , A) from the current position to the predetermined topography recognition distance dA. A positive value of the inclination degree parameter Svol indicates that the proportion of the upward gradient in the actual topography 50 is high. In addition, when the inclination degree parameter Svol is a positive value, a larger inclination degree parameter Svol indicates a steeper inclination of the upward gradient.

Figure 11:
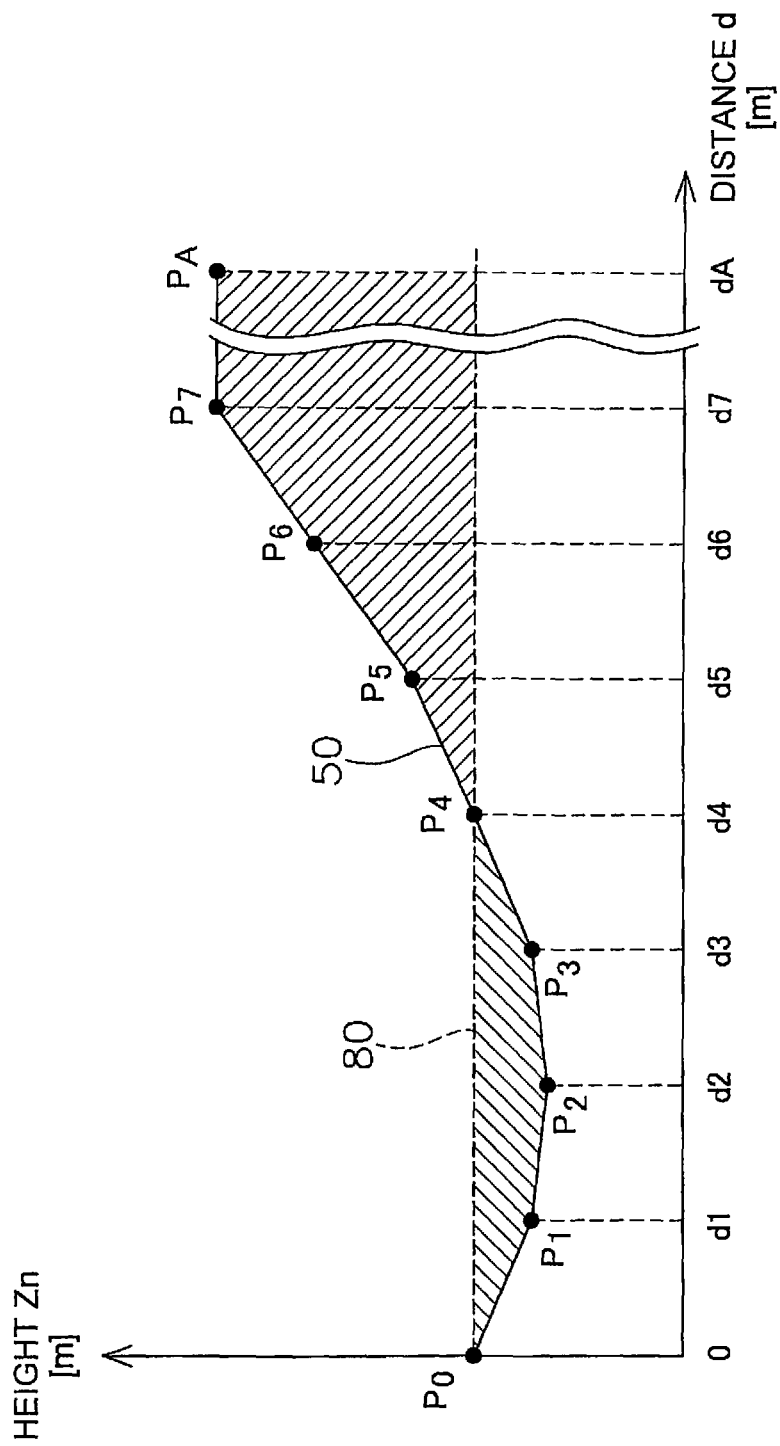
FIG. 11 is a graph illustrating a definition of an inclination degree parameter.

The inclination degree parameter Svol by the formula (3) may be regarded as a cross-sectional area between the actual topography 50 and the horizontal surface 80 as illustrated in FIG. 11. In this case, the sum of the cross-sectional areas may be determined as the inclination degree parameter Svol, with the cross-sectional area between the horizontal surface 80 and the actual topography 50 positioned above the horizontal surface 80 as a positive value, and with the cross-sectional area between the horizontal surface 80 and the actual topography 50 positioned below the horizontal surface 80 as a negative value.

A negative value of the inclination degree parameter Svol indicates that the proportion of the downward gradient in the actual topography 50 is high. In addition, when the inclination degree parameter Svol is a negative value, a smaller inclination degree parameter Svol indicates a steeper inclination of the downward gradient.

In step S302, the controller 26 determines whether the inclination degree parameter Svol is larger than a predetermined first threshold S1. The first threshold S1 is a value for determining that the proportion of the upward gradient in the actual topography 50 is high. Therefore, the controller 26 determines whether the actual topography 50 is an upward gradient according to the inclination degree parameter Svol. When the inclination degree parameter Svol is larger than the first threshold S1, the process proceeds to step S303.

In step S303, the controller 26 determines the correction coefficient t1 according to the inclination degree parameter Svol. For example, the storage device 28 may store data defining the relation between the inclination degree parameter Svol and the correction coefficient t1. The controller 26 may determine the correction coefficient t1 according to the inclination degree parameter Svol by referring to the data.

The correction coefficient t1 is a positive value less than one. Therefore, when the controller determines that the actual topography 50 is an upward gradient, the controller decreases a displacement amount of the target design topography 70 from the actual topography 50 by multiplying the target displacement Z_offset by the correction coefficient t1. When the inclination degree parameter Svol is larger than the predetermined first threshold S1, a larger value of the inclination degree parameter Svol indicates a smaller correction coefficient t1.

In step S302, when the inclination degree parameter Svol is equal to or less than the first threshold S1, the process proceeds to step S304. In step S304, the controller 26 determines whether the inclination degree parameter Svol is smaller than a predetermined second threshold S2. The second threshold S2 is smaller than the first threshold S1. The second threshold S2 is a value for determining that the proportion of the downward gradient in the actual topography 50 is high. Therefore, the controller 26 determines whether the actual topography 50 is a downward gradient according to the inclination degree parameter Svol. When the inclination degree parameter Svol is smaller than the second threshold S2, the process proceeds to step S305.

In step S305, the controller 26 determines the correction coefficient t1 according to the inclination degree parameter Svol. When the inclination degree parameter Svol is smaller than the second threshold S2, the correction coefficient t1 is a value greater than one. Therefore, when the controller determines that the actual topography 50 is a downward gradient, the controller increases a displacement amount of the target design topography 70 from the actual topography 50 by multiplying the target displacement Z_offset by the correction coefficient t1. When the inclination degree parameter Svol is smaller than the predetermined second threshold S2, a smaller value of the inclination degree parameter Svol indicates a larger correction coefficient t1.

In step S304, when the inclination degree parameter Svol is equal to or greater than the second threshold S2, the process proceeds to step S306. In step S306, the controller 26 sets the correction coefficient t1 to one. That is, when the inclination degree parameter Svol is equal to or less than the first threshold S1 and equal to or greater than the second threshold S2, the correction of the target displacement Z_offset by the correction coefficient t1 is not performed.

As described above, the height Z of the target design topography 70 is determined from the aforementioned formula (2) by determining the target displacement Z_offset and the correction coefficient t1.

In step S108 illustrated in FIG. 4, the controller 26 controls the blade 18 toward the target design topography 70. At this time, the controller 26 generates a command signal to the work implement 13 so that the tip position of the blade 18 moves toward the target design topography 70 generated in step S107. The generated command signal is input to the control valve 27. As a result, the blade tip position P0 of the work implement 13 moves along the target design topography 70.

In the aforementioned digging region, the target displacement Z_offset between the actual topography 50 and the target design topography 70 is large compared to the other regions. As a result, the digging work of the actual topography 50 is performed in the digging region. In the soil transportation region, the target displacement Z_offset between the actual topography 50 and the target design topography 70 is small compared to the other regions. As a result, the digging of the ground surface is suppressed and the soil held by the blade 18 is transported in the soil transportation region.

In step S109, the controller 26 updates work site topography data. The controller 26 updates the work site topography data according to position data indicating the latest trajectory of the blade tip position P0. Alternatively, the controller 26 may calculate the position of the bottom surface of the crawler belts 16 from the vehicle body position data and the vehicle body dimension data, and update the work site topography data according to the position data indicating the trajectory of the bottom surface of the crawler belts 16. In this case, the update of the work site topography data can be performed instantly.

Alternatively, the work site topography data may be generated from survey data measured by a survey device outside of the work vehicle 1. Aerial laser survey may be used as an external survey device, for example. Alternatively, the actual topography 50 may be imaged by a camera, and the work site topography data may be generated from the image data captured by the camera. For example, aerial photographic survey using an unmanned aerial vehicle (UAV) may be used. In the case of using the external survey device or the camera, the work site topography data may be updated at a predetermined interval, or as needed.

The above processing is executed when the work vehicle 1 moves forward. For example, the above processing is executed when the first operating device 25a is in the forward position. When the work vehicle 1 moves in reverse by a predetermined distance or more, the digging start position, the moving distance n, and the amount of soil held by the blade 18 are initialized.

The above processing is executed when the work vehicle 1 moves forward again. The controller 26 updates the actual topography 50 based on the updated work site topography data, and newly determines the target design topography 70 based on the updated actual topography 50. The controller 26 then controls the blade 18 along the newly determined target design topography 70. This processing is repeated to perform digging so that the actual topography 50 approaches the final design topography 60.

In the above embodiment, the controller 26 repeats the processing from steps S101 to S109 every time the work vehicle 1 moves forward by a predetermined distance, or at a predetermined time interval during moving forward. However, the controller 26 may repeat the processing from steps S101 to S109 every time the work vehicle 1 moves in reverse by a predetermined distance, or at a predetermined time interval during moving in reverse.

In the control system 3 of the work vehicle 1 according to the present embodiment described above, the controller 26 determines whether the actual topography 50 is an upward gradient or a downward gradient based on the actual topography data, and changes the target design topography 70 according to a result of determination.

Specifically, when the actual topography 50 is an upward gradient, the correction coefficient t1 is determined in such a manner that the displacement amount of the target design topography 70 from the actual topography 50 decreases. As a result, the target design topography 70 is changed. When the actual topography 50 is an upward gradient, the load on the work implement 13 tends to be large. Therefore, the load on the work implement 13 can be prevented from becoming excessive by changing the target design topography 70 as described above.

When the actual topography 50 is a downward gradient, the correction coefficient t1 is determined in such a manner that the displacement amount of the target design topography 70 from the actual topography 50 increases. As a result, the target design topography 70 is changed. When the actual topography 50 is a downward gradient, the load on the work implement 13 tends to be small. Therefore, the amount of soil to be dug by the work implement 13 can be increased by changing the target design topography 70 as described above. As a result, work efficiency can be improved.

Further, when the inclination degree parameter Svol is larger than the first threshold S1, a larger value of the inclination degree parameter Svol indicates a smaller correction coefficient t1. When the actual topography 50 is an upward gradient, a larger value of the inclination degree parameter Svol indicates a steeper inclination of the upward gradient. Therefore, as the inclination of the upward gradient is steeper, the correction coefficient t1 decreases. As a result, the displacement amount of the target design topography 70 from the actual topography 50 decreases. This enables to determine the displacement amount of the target design topography 70 appropriately according to the degree of the inclination of the upward gradient.

When the inclination degree parameter Svol is smaller than the second threshold S2, a smaller value of the inclination degree parameter Svol indicates a larger correction coefficient t1. When the actual topography 50 is a downward gradient, a smaller value of the inclination degree parameter Svol indicates a steeper inclination of the downward gradient. Therefore, as the inclination of the downward gradient is steeper, the correction coefficient t1 increases. As a result, the displacement amount of the target design topography 70 from the actual topography 50 increases. This enables to determine the displacement amount of the target design topography 70 appropriately according to the degree of the inclination of the downward gradient.

Although an embodiment of the present invention has been described so far, the present invention is not limited to the above embodiment and various modifications may be made within the scope of the invention.

The work vehicle 1 is not limited to the bulldozer, and may be another vehicle such as a wheel loader or a motor grader.

The work vehicle 1 may be remotely operable. In this case, a portion of the control system 3 may be disposed outside of the work vehicle 1. For example, the controller 26 may be disposed outside of the work vehicle 1. The controller 26 may be disposed inside a control center separated from the work site.

Figure 12:
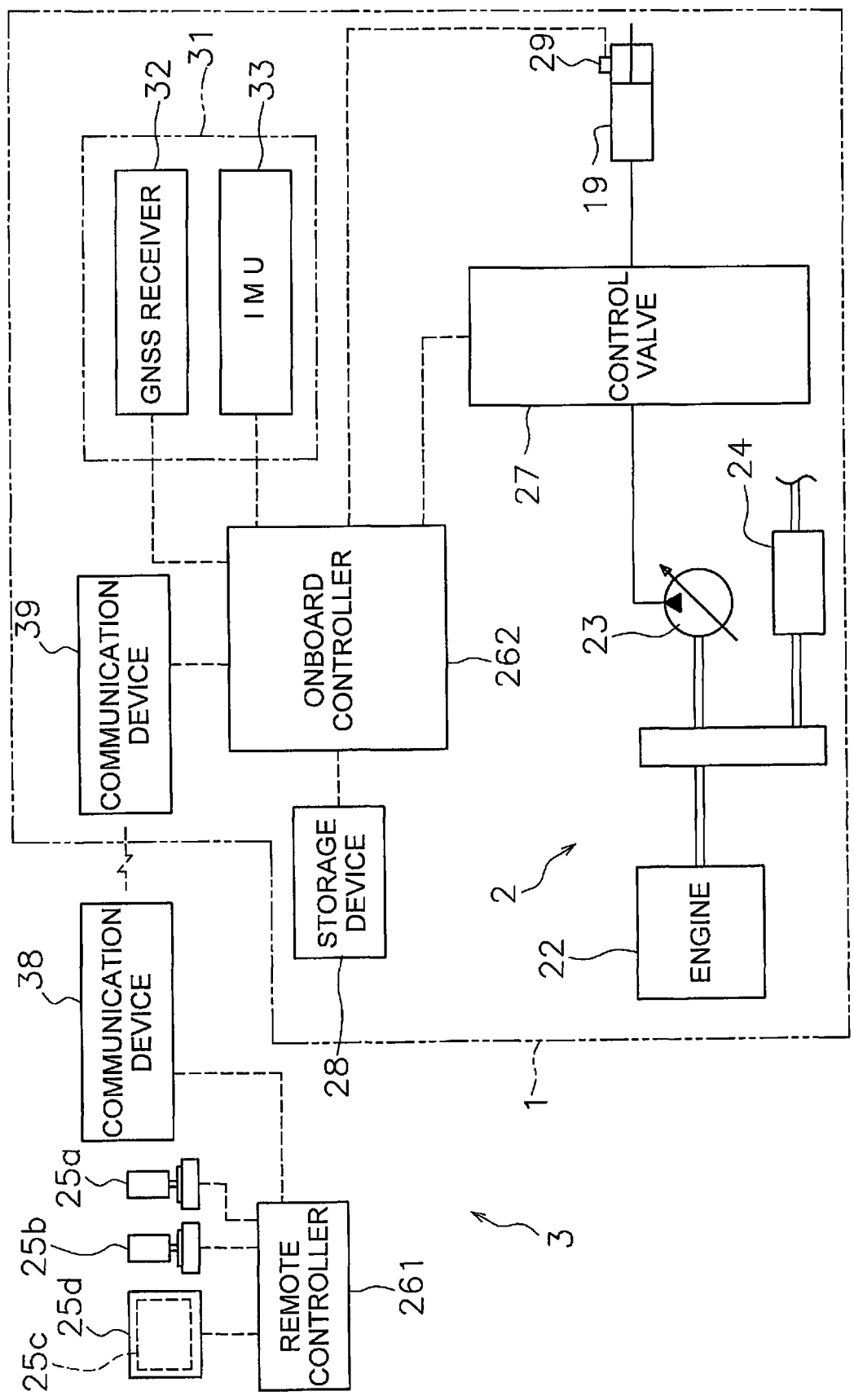
FIG. 12 is a block diagram of a configuration of a control system according to a first modified example.

The controller 26 may have a plurality of controllers 26 separated from one another. For example, as illustrated in FIG. 12, the controller 26 may include a remote controller 261 disposed outside of the work vehicle 1 and an onboard controller 262 mounted on the work vehicle 1. The remote controller 261 and the onboard controller 262 may be able to communicate wirelessly via the communication devices 38 and 39. Some of the aforementioned functions of the controller 26 may be executed by the remote controller 261, and the remaining functions may be executed by the onboard controller 262. For example, the processing for determining the target design topography 70 may be executed by the remote controller 261, and the processing for outputting a command signal to the work implement 13 may be executed by the onboard controller 262.

The operating devices 25a and 25b, the input device 25c, and the display 25d may be disposed outside the work vehicle 1. In this case, the operating cabin may be omitted from the work vehicle 1. Alternatively, the operating devices 25a and 25b, the input device 25c, and the display 25d may be omitted from the work vehicle 1. The work vehicle 1 may be operated only by the automatic control by the controller 26 without operation of the operating devices 25a and 25b.

Figure 13:
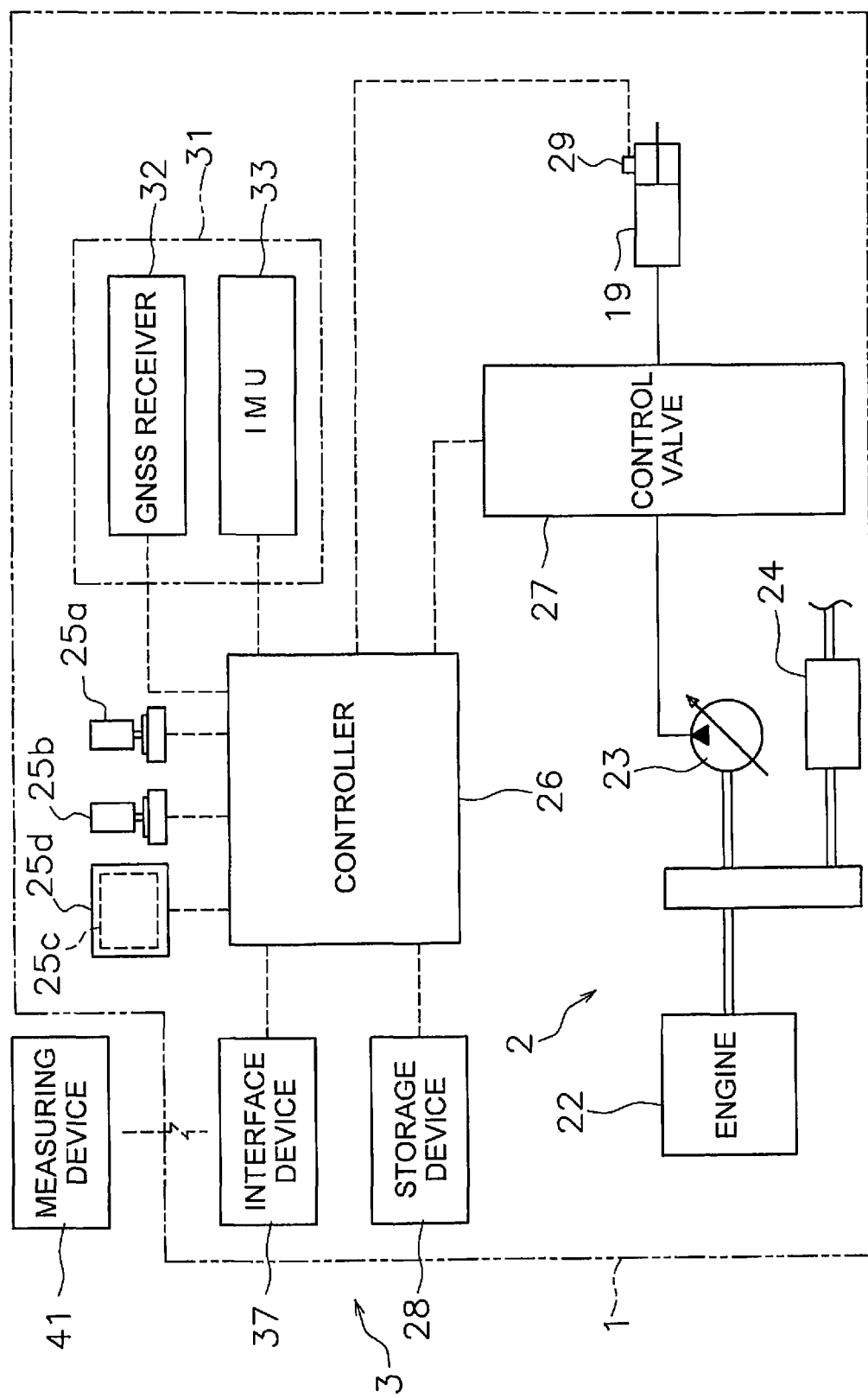
FIG. 13 is a block diagram of a configuration of a control system according to a second modified example.

The actual topography 50 may be acquired by another device, instead of the aforementioned position sensor 31. For example, as illustrated in FIG. 13, the actual topography 50 may be acquired by an interface device 37 that receives data from an external device. The interface device 37 may wirelessly receive the actual topography data measured by an external measuring device 41. Alternatively, the interface device 37 may be a recording medium reading device and may receive the actual topography data measured by the external measuring device 41 via the recording medium.

The target parameter data is not limited to the data illustrated in FIG. 7 and may be changed. The target parameter is the parameter related to the target digging amount of the work implement 13 and is not limited to the target displacement of the above embodiment, and may be another parameter. For example, FIG. 14 is a graph illustrating another example of the target parameter data.

Figure 14:
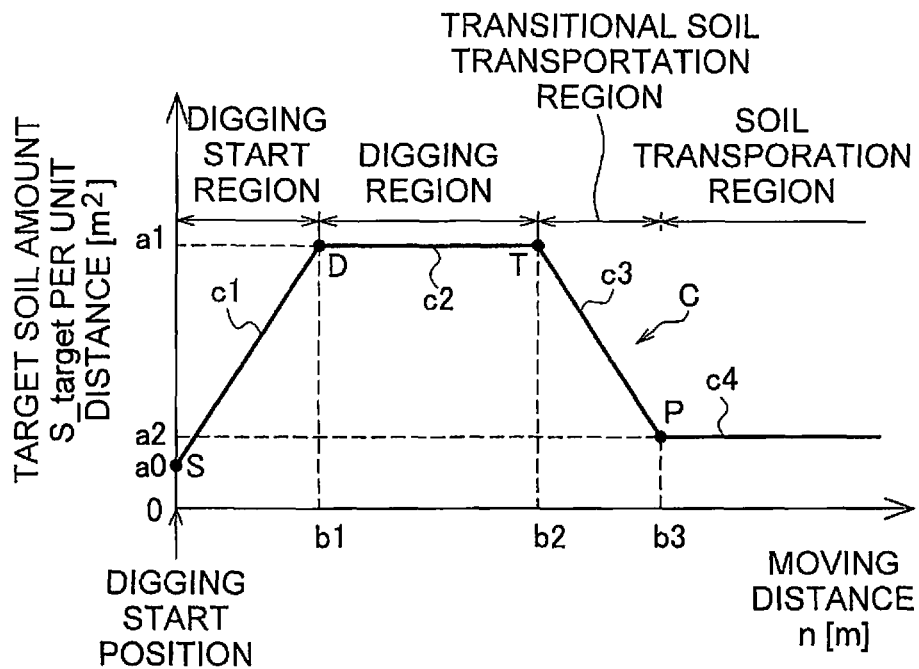
FIG. 14 is a graph illustrating another example of target parameter data.

As illustrated in FIG. 14, the target parameter may be a target soil amount S_target at each point in a flat topography. That is, the target parameter may be the target soil amount S_target per unit distance. For example, the controller 26 can calculate the target displacement Z_offset from the target soil amount S_target and the width of the blade 18. Alternatively, the target parameter may be a parameter different from the target soil amount S_target per unit distance. For example, the target parameter may be a parameter indicating a target value of the load on the work implement 13 at each point. The controller 26 can calculate the target displacement Z_offset at each point from the target parameter. In this case, the controller 26 may increase the target displacement Z_offset as the target parameter increases.

The target displacement Z_offset may be multiplied by a predetermined coefficient other than t1. Alternatively, a predetermined constant may be added to or subtracted from the target displacement Z_offset. The predetermined coefficient and the predetermined constant may be changed according to the change of the control mode.

In the smoothing processing indicated by the above formula (1), the average of the height of five points is calculated. However, the number of points used for smoothing may be less than five or greater than five. The number of points used for smoothing can be varied, and the operator can set the desired degree of smoothing by changing the number of points used for smoothing.

Also, the average to be calculated is not limited to the average of the height of the points to be smoothed and points ahead and behind, but also the average of the height of the points to be smoothed and points located in front. Alternatively, the average of the height of the points to be smoothed and points located behind may be calculated. Alternatively, the smoothing processing is not limited to the method using average but also another smoothing processing such as least squares method or n-order approximation may be used. Alternatively, the smoothing processing may be omitted.

In the above embodiment, the inclination degree parameter Svol is the difference between the average of the height of the actual topography 50 and the height of the horizontal surface 80 but is not limited to the aforementioned embodiment as long as the inclination degree parameter Svol indicates the direction and degree of the inclination of the gradient. For example, the inclination degree parameter Svol may be a volume instead of the cross-sectional area between the actual topography 50 and the horizontal surface 80.

Figure 15:
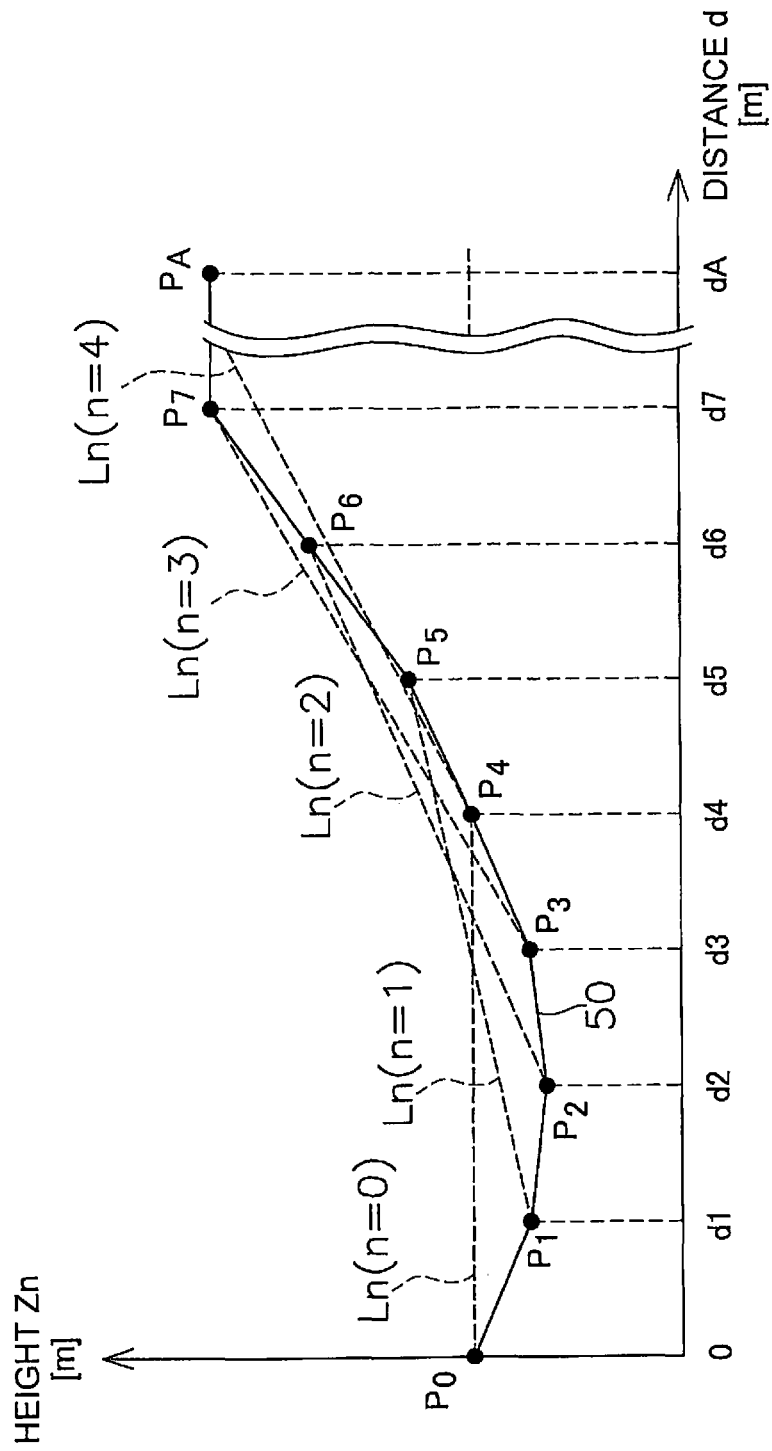
FIG. 15 is a graph illustrating another example of an inclination degree parameter.

Alternatively, the controller 26 may calculate an inclination angle of the actual topography 50 and determine the inclination angle as the inclination degree parameter Svol. For example, as illustrated in FIG. 15, the controller calculates an inclination An (n=0, 1, . . . , A) of a straight line Ln connecting any two reference points of the actual topography 50. The inclination An of the straight line Ln connecting any two reference points of the actual topography 50 is calculated by the following formula (4).

$$A_n = (Z_{n+Nref} - Z_n)/N_{ref} \quad (4)$$

Nref is a value indicating the interval between two reference points. For example, when Nref is four, the inclination An is the inclination of the straight line connecting any one reference point and the fourth reference point counting from the reference point in the traveling direction of the work vehicle 1. The controller 26 acquires the aforementioned inclination An (n=0, 1, . . . , A) with respect to the plurality of reference points Pn from the current position to the predetermined topography recognition distance dA. The controller 26 may determine the minimum value, the maximum value, or the average of the inclination An (n=0, 1, . . . , A) as the inclination degree parameter Svol.

The controller 26 may acquire the actual topography data within a shorter range than the predetermined topography recognition distance dA from the current position. That is, the controller 26 may acquire the actual topography data with respect to only a portion of the plurality of reference points Pn. The controller 26 may determine the target design topography 70 within a shorter range than the predetermined topography recognition distance dA from the current position. That is, the controller 26 may determine the target design topography 70 with reference to only a portion of the plurality of reference points Pn.

In the present invention, the target design topography is determined based on the actual topography, and the target design topography is changed according to a result of determination as to whether the actual topography is an upward gradient or a downward gradient. As a result, the load on the work implement can be prevented from becoming excessive while work efficiency can be improved.

The invention claimed is:

1. A control system for a work vehicle including a work implement, the control system comprising:
a controller configured to
acquire actual topography data indicating an actual topography to be worked,
determine a target design topography indicating a target trajectory of the work implement based on the actual topography, the target design topography being determined by vertically displacing the actual topography,
determine whether the actual topography is an upward gradient or a downward gradient based on the actual topography data, and
change the displacement amount of the target design topography upon determining that the actual topography is the upward gradient or the downward gradient.

2. The control system for a work vehicle according to claim 1, wherein
the controller is further configured to
decrease the displacement amount of the target design topography from the actual topography upon determining that the actual topography is the upward gradient.

3. The control system for a work vehicle according to claim 2, wherein
the controller is further configured to decrease the displacement amount as an inclination of the upward gradient is steeper.

4. The control system for a work vehicle according to claim 1, wherein
the controller is further configured to
increase the displacement amount of the target design topography from the actual topography upon determining that the actual topography is the downward gradient.

5. The control system for a work vehicle according to claim 4, wherein
the controller is further configured to increase the displacement amount as an inclination of the downward gradient is steeper.

6. The control system for a work vehicle according to claim 1, wherein
the controller being further configured to
acquire an inclination degree parameter indicating a degree of inclination of the actual topography based on the actual topography data, and
determine whether the actual topography is an upward gradient or a downward gradient according to a value of the inclination degree parameter.

7. The control system for a work vehicle according to claim 6, wherein
the controller is further configured to
calculate a difference between the actual topography and a predetermined horizontal surface, and
determine the difference as the inclination degree parameter.

8. The control system for a work vehicle according to claim 1, further comprising:
- a position sensor that outputs a position signal indicating a position of the work vehicle; and
- a storage device that stores target parameter data that defines a relation between a moving distance of the work vehicle and a target parameter related to a target digging amount of the work implement,
- the controller being further configured to
  - receive the position signal from the position sensor,
  - acquire a moving distance of the work vehicle from the position signal,
  - refer to the target parameter data to determine the target parameter from the moving distance of the work vehicle,
  - determine a target displacement according to the target parameter,
  - change the target displacement according to a result of determination of the gradient, and
  - determine the target design topography by vertically displacing the actual topography by the target displacement.

9. A method executed by a controller for setting a trajectory of a work implement of a work vehicle, the method comprising:
- acquiring actual topography data indicating an actual topography to be worked;
- determining a target design topography indicating a target trajectory of the work implement based on the actual topography, the target design topography being determined by vertically displacing the actual topography;
- determining whether the actual topography is an upward gradient or a downward gradient based on the actual topography data; and
- changing the displacement amount of the target design topography upon determining that the actual topography is the upward gradient or the downward gradient.

10. The method according to claim 9, wherein
the changing the target design topography includes decreasing the displacement amount of the target design topography from the actual topography upon determining that the actual topography is the upward gradient.

11. The method according to claim 10, wherein
the changing the target design topography further includes decreasing the displacement amount as an inclination of the upward gradient is steeper.

12. The method according to claim 9, wherein
the changing the target design topography includes increasing the displacement amount of the target design topography from the actual topography upon determining that the actual topography is the downward gradient.

13. The method according to claim 12, wherein
the changing the target design topography further includes increasing the displacement amount as an inclination of the downward gradient is steeper.

14. The method according to claim 9, further comprising:
acquiring an inclination degree parameter indicating a degree of inclination of the actual topography based on the actual topography data,
the determining whether the actual topography is an upward gradient or a downward gradient including determining whether the actual topography is an upward gradient or a downward gradient according to a value of the inclination degree parameter.

15. The method according to claim 14, wherein the acquiring the inclination degree parameter further includes
calculating a difference between the actual topography and a predetermined horizontal surface, and
determining the difference as the inclination degree parameter.

16. A work vehicle comprising:
a work implement; and
a controller configured to control the work implement, the controller being configured to
- acquire actual topography data indicating an actual topography to be worked,
- determine a target design topography indicating a target trajectory of the work implement based on the actual topography, the target design topography being determined by vertically displacing the actual topography,
- determine whether the actual topography is an upward gradient or a downward gradient based on the actual topography data,
- change the displacement amount of the target design topography upon determining that the actual topography is the upward gradient or the downward gradient, and
- output a command signal for controlling the work implement according to the target design topography.

17. The work vehicle according to claim 16, wherein the controller is further configured to
decrease the displacement amount of the target design topography from the actual topography upon determining that the actual topography is the upward gradient.

18. The work vehicle according to claim 17, wherein
the controller is further configured to decrease the displacement amount as an inclination of the upward gradient is steeper.

19. The work vehicle according to claim 16, wherein
the controller is further configured to
increase the displacement amount of the target design topography from the actual topography upon determining that the actual topography is the downward gradient.

20. The work vehicle according to claim 19, wherein
the controller is further configured to increase the displacement amount as an inclination of the downward gradient is steeper.

* * * * *